US006845976B2

(12) United States Patent
Martin et al.

(10) Patent No.: US 6,845,976 B2
(45) Date of Patent: Jan. 25, 2005

(54) PALLET PIN SHEET FANNER WITH FLOATING MAGNETIC ASSEMBLY

(76) Inventors: Claire T. Martin, 08211 See Rd., Charlevoix, MI (US) 49720; Walter J. Shear, III, 2254 Carlos Dr., Waterford, MI (US) 48327

( * ) Notice: Subject to any disclaimer, the term of this patent is extended or adjusted under 35 U.S.C. 154(b) by 0 days.

(21) Appl. No.: 10/293,767

(22) Filed: Nov. 13, 2002

(65) Prior Publication Data
US 2004/0089993 A1 May 13, 2004

(51) Int. Cl.$^7$ ................................................. B65H 3/16
(52) U.S. Cl. ..................................... 271/18.1; 271/145
(58) Field of Search ................................ 271/18.1, 145

(56) References Cited

U.S. PATENT DOCUMENTS

| | | | |
|---|---|---|---|
| 1,716,602 A | | 6/1929 | Ross |
| 2,341,639 A | | 2/1944 | Mathiesen |
| 2,650,092 A | | 8/1953 | Wall |
| 2,847,212 A | * | 8/1958 | Stem ........................ 271/18.1 |
| 4,392,766 A | | 7/1983 | Blunt |
| 4,743,006 A | | 5/1988 | Bolle, Jr. et al. |
| 4,815,916 A | | 3/1989 | Beck |
| 5,018,939 A | * | 5/1991 | Kishi et al. .............. 414/795.4 |
| 5,242,508 A | * | 9/1993 | McCallum et al. ......... 148/101 |
| 5,309,977 A | * | 5/1994 | Yoneyama et al. ......... 164/463 |
| 5,651,541 A | * | 7/1997 | Prime ........................ 271/18.1 |
| 6,293,538 B1 | | 9/2001 | Niedzielski et al. |
| 6,612,560 B2 | * | 9/2003 | Sanders ................... 270/58.12 |
| 6,638,002 B1 | * | 10/2003 | Martin ....................... 414/788 |

* cited by examiner

Primary Examiner—David H. Bollinger
(74) Attorney, Agent, or Firm—Young & Basile, P.C.

(57) ABSTRACT

The invention is a pallet pin which contains an integral floating magnet assembly. The floating magnet assembly is mounted within the internal cavity of the pin and is attached to a longitudinally extending member which is located within the interior space of the fanner housing. The floating magnet assembly is provided with low-friction rollers which engage the longitudinally extending member. The magnet assembly is thereby permitted to traverse freely the length of the interior of the housing of the device, permitting the permanent magnet assembly to automatically reposition itself in relation to an adjoining sheet of magnetic material, and to induce the upper sheets of a stack of magnetic materials to separate. The entire assembly is mounted within a housing having a handle, and one or more locating holes for the purpose of positioning the entire assembly in relation to a pallet on which sheets of magnetic material may be stored. The invention both restrains lateral movement of the sheets of magnetic material and provides separating forces to separate the upper sheets from the stack so that they may be manipulated for removal from the stack.

8 Claims, 3 Drawing Sheets

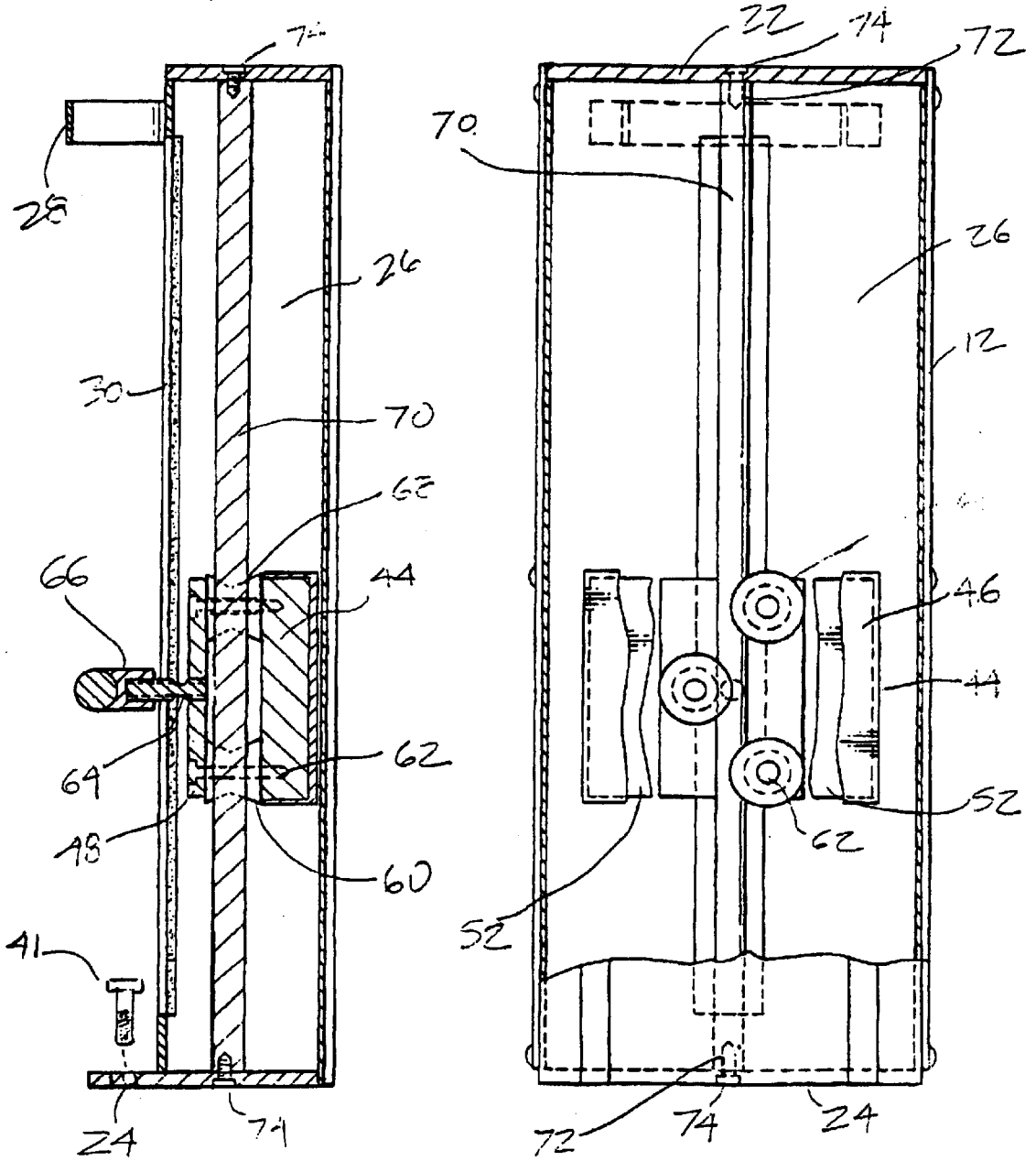

PALLET PIN SHEET FANNER WITH FLOATING MAGNETIC ASSEMBLY

FIELD OF THE INVENTION

The invention pertains to permanent magnetic devices for separating stacks of sheets of magnetic material.

BACKGROUND OF THE INVENTION

The use of fanner magnets is well known in the manufacturing arts. Fanner magnets serve to fan out or separate sheets in a stack of metal sheets, thereby facilitating the movement or transfer of sheets through the use of utilizing handling devices, such as pickups, suction cups, or other lifting or moving devices. Such magnets operate on the principle of creating repelling polarities among adjoining individual sheets in a stack.

There are a wide variety of methods used for separating magnetic sheets. One example is found in U.S. Pat. No. 4,815,916, issued to James A. Beck, and teaching a plurality of magnetic elevator devices disposed along the sides of a vertical stack of magnetizable steel objects, such as sheets. Another type of device is found in U.S. Pat. No. 4,743,006, issued to Fred Bole, Jr., et al., and discloses a fanner magnet assembly including a power-actuated carriage for movement relative to a stack of sheets.

A particularly useful type of magnetic separator is the pallet pin-type, of the type manufactured and sold by Industrial Magnetics under the descriptive name "magnetic pin fanners" as shown in the Industrial Magnetics' brochure Auto 8B (6/00), and described in a currently pending U.S. patent application Ser. No. 09/932,801. Pallet mount permanent magnet pin fanners are unique in that they are readily positionable around a stack of metal sheets mounted to a pallet, where they serve the dual function of confining the lateral movement of the sheets as well as separating them.

However, whereas the earlier-filed application, above-referenced, teaches a useful device, it has been learned that significant improvements may be made in the art of pallet pin sheet fanners utilizing a floating magnet assembly.

A floating magnet assembly for use on sheet fanners is taught in U.S. Pat. No. 2,847,212 by D. E. Stem. This device and methodology, however, are limited in that the '212 invention is not a pallet pin-type device and because the movable magnet assembly therein contained is mounted in such a way as to allow jamming, preventing free movement of the floating magnet assembly in relation to the stack of sheets to be separated.

The present invention overcomes the limitations of the prior art by incorporating a roller-mounted magnet assembly movable along the length of a cylindrical rail. The entire magnet assembly and rail are positioned within a housing which is readily repositionable and in the form of a pallet pin.

SUMMARY OF THE INVENTION

The invention is a new type of pallet pin which contains an integral floating magnet assembly. The floating magnet assembly is mounted within the internal cavity of the pin and is attached to a longitudinally extending member which is coaxial with the fanner housing.

The floating magnet assembly is provided with low-friction rollers which engage a cylindrical track extending longitudinally from the top to the bottom of the housing. The magnet assembly is thereby free to traverse the length of the interior of the housing of the device, permitting the magnet assembly to position itself in relation to an adjoining sheet of magnetic material, and to induce the upper sheets of a stack of magnetic materials to separate. The floating magnet assembly automatically repositions itself in relation to the top of the stack as sheets are removed from the stack.

The magnet assembly includes one or more permanent magnets to provide the magnetic forces necessary to separate the sheets, without the requirement for any external power, such as that required by electromagnets. The entire assembly is mounted within a housing having a handle, and one or more locating elements for the purpose of positioning the entire assembly in relation to a pallet on which sheets of magnetic material may be stored. This permits the invention to be used to both restrain lateral movement of the sheets of magnetic material and provide separating forces to separate the upper sheets from the stack so that they may be gripped, lifted or otherwise manipulated for removal from the stack.

DETAILED DESCRIPTION OF THE DRAWINGS

FIG. 4 is a cutaway side view of the invention showing the relationship of the magnet assembly to the interior of the housing as well as the rail.

FIG. 5 is a cutaway front view of the invention showing the magnet assembly in relation to the rail.

DETAILED DESCRIPTION OF THE EMBODIMENT

Figure 3:
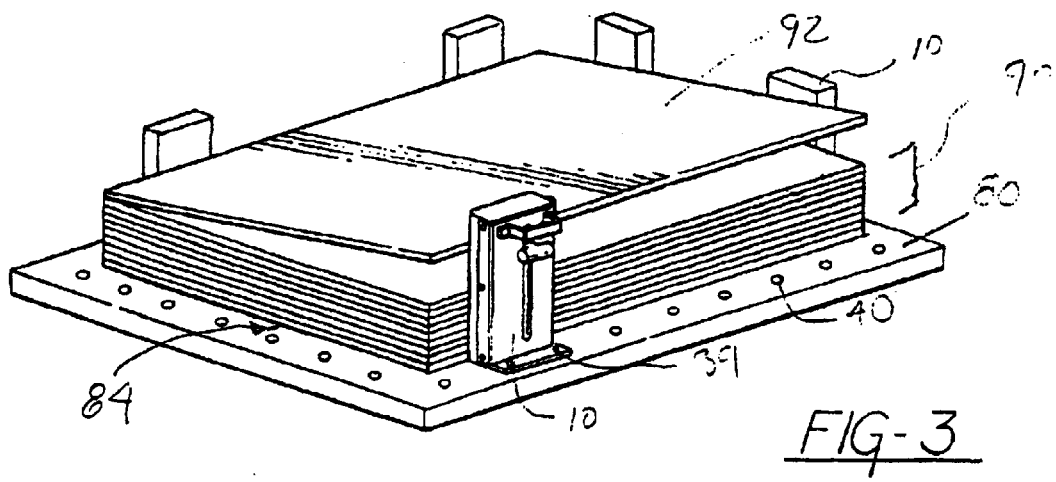
FIG. 3 is a perspective view showing a plurality of devices disposed on a pallet and shown in relation to a stack of sheets of material to be separated.
Figure 6:
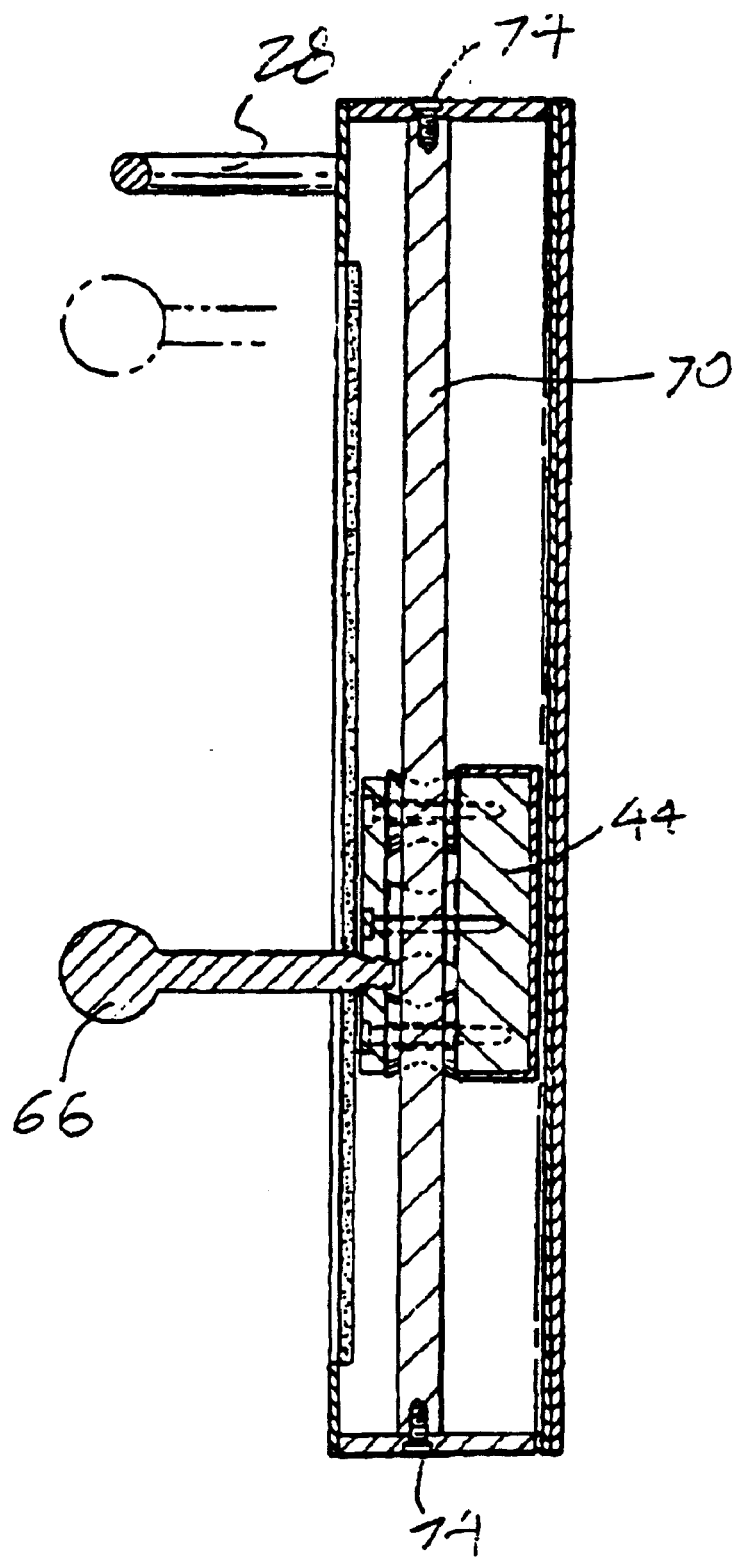
FIG. 6 is a cutaway side view of the invention, showing, in phantom view, the position of the operating handle when the magnet assembly is positioned near the top of the invention.

An understanding of the function and environment of the invention is shown in FIG. 3, which depicts the sheet fanner 10 positioned on a typical pallet 80 on which is stored for retrieval a plurality of sheets 92 of ferro-magnetic material, such as steel. In a typical industrial environment, this stack 90 of sheets 92 of steel would be stored on the pallet 80 to permit it to be readily transported within a manufacturing facility, and positioned, as a palletized stack 90 of raw materials, adjacent to personnel and machinery which will utilize the individual sheets 92 for the fabrication of a finished or semi-finished component. A typical application might be, for example, the stamping of an automobile body component from a steel sheet. The pallet 80 would be positioned in proximity to a forming press, and individual sheets 92 of steel removed from the pallet 80 by a lifting device, elevated away from the pallet 80, and fed into the press. Since steel of the character typically used for this type of operation may be pretreated with coatings or oil, there is a tendency for the individual sheets 92 in a stack 90 to stick together, making it difficult for a single sheet 92 to be lifted from the stack 90, until at least a portion of each sheet 92 is separated from the underlying sheets.

A magnetic sheet fanner 10 adjacent to the edge of the stacked sheets 92 induces in the sheets an identical magnetic polarity, which causes the sheets 92 to tend to repel one another. This magnetic field is strongest in the area of the sheet 92 in closest proximity to the magnetic sheet fanner 10. Placement of the sheet fanner 10 near the edge of the stacked sheets 92, accordingly, tends to separate those edges of the sheets 92 closest to the sheet fanner 10. Once a portion of the sheet 92 has been separated from the underlying sheet, the layer of air or oil film which may cause the adjacent sheets to resist separation is broken, so that only the necessary lifting force to overcome the weight of the sheet 92 is required to move the sheet 92 from its position on the stack 90.

Each sheet fanner 10 is provided with one or more locating holes 39 configured to align with one or more locating sockets 40 in the pallet. In this fashion, the sheet fanner 10 can be installed and removed quickly to and from a variety of locations around the perimeter of the pallet 80. By providing the pallet 80 with a plurality of socket 40 locations, each pallet 80 can be configured to accommodate a wide variety of shapes and sizes of sheets of material. One method of attachment of sheet fanner 10 to pallet 80 is by use of a threaded fasteners 41. Sockets 40 may be provided with threads to engage fasteners 41.

Figure 1:
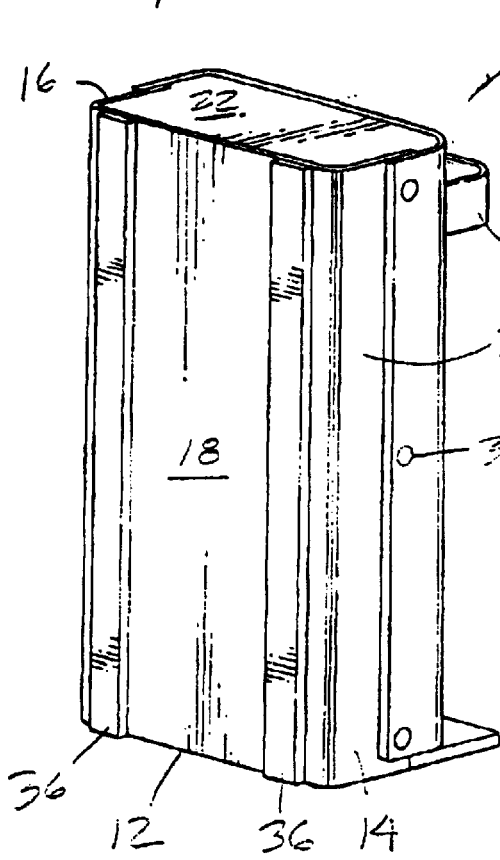
FIG. 1 is a perspective view of the invention showing the front of the device.
Figure 2:
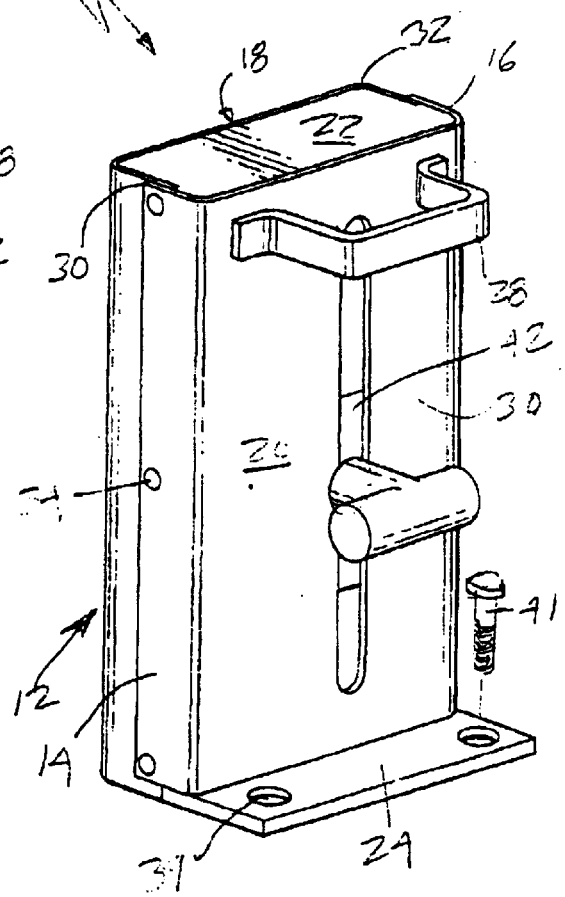
FIG. 2 is a perspective view of the invention showing the rear of the device.

The overall structure of the invention will further be appreciated by reference to FIGS. 1 and 2. The sheet fanner 10 is in the form of an elongate housing 12, having left side 14 and right side 16, a front 18, a rear 20, a top cover 22 and a base 24. The housing 12 serves to define an interior space 26 as shown in FIG. 4. On the outside of the housing 12 is located a lifting handle 28, to facilitate movement of the assembly 10 to and from a pallet 80. The elongate configuration of the housing 12 is selected to provide a relatively tall separator in relation to a stack 90 of sheets 92 which will be subject to the magnetic fields created by the sheet fanner 10. The sheet fanner 10 engages a pallet 80 in one of several locations around the perimeter of the pallet 80. By positioning the sheet fanner 10 in close relationship to stack 90, a magnetic field may be induced in the sheets 92 making up the stack 90, and because each sheet 92 acquires like polarity, causing the individual sheets 92 to repel and separate.

With further reference to FIG. 2, the sheet fanner 10 includes a housing 12 having a left side 14, right side 16, front 18 and rear 20. The housing is further provided with atop cover 22 and a base 24. Collectively, these sides, top and base are of non-magnetic stainless steel and define an interior space 26 which serves to enclose a magnetic assembly 44. The housing 12 is formed of a generally U-shaped (in cross-section) back piece 30 and a U-shaped (in cross-section) front piece 32 which, when fastened together with suitable fasteners such as rivets 34 define a generally tubular structure of rectangular cross-section. Base 24 serves to define the bottom of the housing 12 and to provide the attachment point in the form of locating holes 39 which will engage socket 40 in the pallet 80. Top cover 22 serves to complete the enclosure. Housing back piece 30 is provided with a slot 42 to accommodate portions of the magnet assembly 44 which will be described further herein. On the front 18 of the housing front piece 32 there are disposed two parallel wear strips 36 of non-magnetic material which are typically spot-welded to the housing front 18.

With reference to FIG. 4 and FIG. 5, the detailed internal construction of the magnetic sheet fanner 10 will be best understood. The magnetic assembly 44 consists of a magnet wrapper 46 and magnet back plate 48, both of stainless steel. The magnet assembly 44 contains a plurality of permanent magnets 52, typically neodymium magnets known for their strong magnetic strength characteristics and comparatively low weight. The magnets 52 are arranged in an array. The number of magnets 52 is selected to provide desired magnetic strength depending on the size of the sheets to be separated. The magnets 52 are separated by spacers of a non-magnetic and insulating material, such as wood or plastic. This configuration of the magnets 52 and magnetic wrapper 46 creates a substantially low profile magnet having opposing poles and of a size selected to fit within the interior space 26 of the housing 12. Attached to the magnet assembly 44 are three concave rollers 60, held to the magnet assembly 44 by roller shafts 62.

The relationship of the various elements of the sheet fanner 10 will also be apparent from a study of FIG. 4 and FIG. 5, showing the housing 12, magnet assembly 44 and rail 70 as well as other important components of the invention. Rail 70 is secured to the housing top cover 22 and base 24 utilizing screws 74 which engage cavities 72 formed in the opposing ends of the rail 70. In this fashion, rail 70 is rigidly affixed within the interior space 26 of the housing 12, and provides a guide and bearing surface for the rollers 60 affixed to magnet assembly 44. Also attached to assembly 44 is a threaded shaft 64 which protrudes through slot 42 in the housing back piece 30. Affixed to threaded shaft 64 is a thumb screw 66 which permits the magnet assembly 44 to be immobilized in relation to the interior space 26 by tightening thumb screw 66, and creating friction between magnetic assembly 44 and the interior of the housing back piece 30. Release of tightening pressure on thumb screw 66 permits magnet assembly 44 to move freely up and down within interior space 26. Rollers 60 are provided with roller grooves 68 sized to engage the outer circumference of rail 70, which is preferably circular in cross-section. The position of the rail 70 and magnet assembly 44 within interior space 26 is selected to insure that there is minimal interference between the outer surfaces of magnet assembly 44 and the inner surfaces of the interior space 26 of the sheet fanner 10.

When the sheet fanner 10 is positioned on pallet 80 in the desired location on the pallet perimeter surrounding the pallet receiving area 84, and a stack 90 of metallic sheets 92 is in position in receiving area 84, it will be appreciated that moving the magnet assembly 44 utilizing thumb screw 66 and threaded shaft 64 to the top-most position of the housing 12 will bring the magnet assembly into position above the top of the stack 90 of sheets 92 located on the pallet 80. By loosening of thumb screw 66 on threaded shaft 64, the magnet assembly 44 is free to "float" in relation to the stack 90 of sheets 92. In operation, the magnets 52 within the magnet assembly 44 will induce a strong magnetic field in the stack 90, which will cause the top sheets 92 to separate from one another, and at the same time, stack 90 will repel magnet assembly 44, inducing it to continue to float at or near the top of the stack 90. The now separated sheets 92 may be more easily removed from the stack 90. As each sheet 92 is removed from the stack 90, the overall height of the stack 90 will be reduced, and the position of the magnet assembly 44 will be automatically readjusted to a lower position on the stack, until such time as the final sheet 92 has been removed.

With the sheet fanner 10 positioned on pallet 80, and more particularly, in a position adjacent the pallet perimeter surrounding the pallet receiving area 84, it will be appreciated that the sheet fanner 10 serves to adjoin and confine the sheets 92 making up the stack 90. With the thumb screw 66 in the loosened or relaxed position in relation to the slot 42 and the housing back piece 30, the thumb screw 66 may be used as a handle to elevate the magnet assembly 44 to position slightly above the top sheet 92 of stack 90. The magnetic field generated by magnet assembly 44 induces a magnetic field in the sheets 92 of the stack 90 and also attracts the magnet assembly 44 downward toward the upper portion of stack 90. As sheets 92 are successively removed from the top of stack 90, magnet assembly 44 will float downward to remain in proximity to the upper portion of the stack 90, until such time as all of the sheets 92 of the stack 90 have been withdrawn from the stack 90. The engagement of the rollers 60 around rail 70 serves to guide the magnet assembly within the interior space 26 of the housing 12. Use of bearings or bushings about roller shaft 62 insures a low friction interface between roller shaft 62 and roller 60, facilitating the ability of magnet assembly 44 to freely move in relation to the housing 12.

While the invention has been described in connection with what is presently considered to be the most practical and preferred embodiments, it is to be understood that the invention is not to be limited to those disclosed embodiments. To the contrary, it is intended to cover various modifications and equivalent arrangements included within the spirit and scope of the appended claims, which scope is intended to be accorded the broadest interpretation so as to encompass all such modifications and equivalent structures as is permitted under the law.

What is claimed is:

1. In a magnetic separator for separating one or more sheets of magnetic material from a stack of said one or more sheets, of the type comprising a housing defining a space interior to said housing, a floating magnet assembly within the interior space of said housing which positions itself in relation to the top of said stack by magnetic attraction, the improvement comprising:

a longitudinal guide member disposed within the interior space of said housing.

2. The invention of claim 1, wherein said floating magnet assembly further comprises means for slidably engaging said guide member.

3. The invention of claim 2, wherein said floating magnet assembly further comprises a plurality of permanent magnets.

4. The invention of claim 3, wherein said each of said plurality of permanent magnets is neodymium.

5. An apparatus for separating one or more sheets of magnetic material from the stack of said one or more sheets comprising:

a floating magnet assembly slidably contained within a non-magnetic housing, said housing comprising at least one side wall and a base;

a pallet provided with a plurality of positioning sockets;

said base defining at least one opening, fastener means engageable with at least one of said plurality of positioning sockets and said at least one opening, whereby said magnet assembly may be removably secured to said pallet.

6. The apparatus of claim 5, wherein said housing further comprises a longitudinal guide member disposed within said housing, and said floating magnet assembly further comprises means for slidably engaging said longitudinal guide member.

7. An apparatus for separating one or more sheets of magnetic material from the stack of said one or more sheets comprising:

a floating magnet assembly slidably contained within a non-magnetic housing, said housing comprising at least one side wall and a base and defining a space interior to said housing;

a pallet provided with a plurality of positioning means;

said base further comprising fastening means engageable with at least one of said plurality of positioning means, whereby said magnet assembly may be removably secured to said pallet;

a longitudinal guide member disposed within the interior space of said housing; and said floating magnet assembly further comprising means for slidably engaging said longitudinal guide member.

8. An apparatus for separating one or more sheets of magnetic material from a stack of said one or more sheets, the apparatus comprising:

a floating magnet assembly contained within a housing, the floating magnet assembly being slideably moveably disposed on a longitudinal guide member provided within said housing, and the floating magnet assembly further being selectively manually positionable in a plurality of vertical positions relative to said guide member.

* * * * *